Feb. 11, 1958  J. KEYLWERT  2,823,085
PISTON FOR INTERNAL COMBUSTION ENGINES
Filed Jan. 24, 1955

United States Patent Office 2,823,085
Patented Feb. 11, 1958

2,823,085

PISTON FOR INTERNAL COMBUSTION ENGINES

Johann Keylwert, Koln-Kalk, Germany, assignor to Klöckner-Humboldt-Deutz Aktiengesellschaft, Koln, Germany Application January 24, 1955, Serial No. 483,564

Claims priority, application Germany February 6, 1954

3 Claims. (Cl. 309—19)

The present invention relates to internal combustion engines and, more particularly to a piston for internal combustion engines, especially two-stroke cycle injection internal combustion engines, in which the wrist pin is connected to one end of the connecting rod and in which the bearing for the wrist pin represents a sliding bearing arranged in a separate wrist pin bed of the piston.

Wrist pin bearings designed as simple sliding bearings have heretofore not been fully satisfactory when used in connection with heavy duty internal combustion engines. The reason therefor consists in the difficulty of lubrication inasmuch as with the heretofore known arrangements of the type set forth above an insufficient quantity of lubricating oil was conveyed to the wrist pin bearing. In addition thereto, with such wrist pin bearing purely mechanical and thermal loads in combination with an unfavorable pressure development in the lubricating oil film bring about a non-permissible wear.

Experience has shown that with the heretofore known arrangements of the type set forth above, a seizing of the running surfaces of the wrist pin bearing occurs easily. This tendency of the bearing to seize can, of course, be reduced by selecting high grade bearing material. This way of overcoming the difficulties outlined above is, however, rather expensive and requires highest precision in maintaining the properties of the respective material.

It is, therefore, an object of the present invention to provide a piston for internal combustion engines, which will overcome the above mentioned drawbacks.

It is another object of this invention to provide a piston for internal combustion engines, especially two-stroke cycle injection internal combustion engines, which will make it possible to journal the wrist pin in relatively inexpensive material while simultaneously increasing the life of a wrist pin bearing.

It is still another object of this invention to provide a piston for use in connection with internal combustion engines, which will be rather simple and inexpensive to produce.

These and other objects and advantages of the invention will appear more clearly from the following specification in connection with the accompanying drawing in which.

Figure 1:
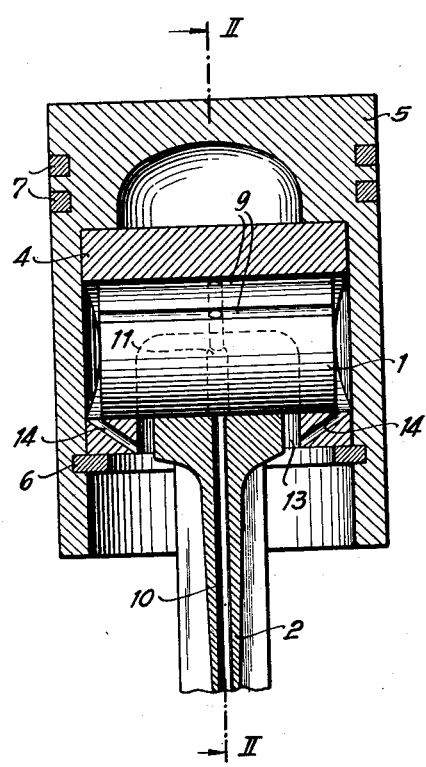
Fig. 1 is a longitudinal section through a piston wrist pin and connecting rod arranged in a manner according to the present invention, said section being taken along the line I—I of Fig. 2.
Figure 2:
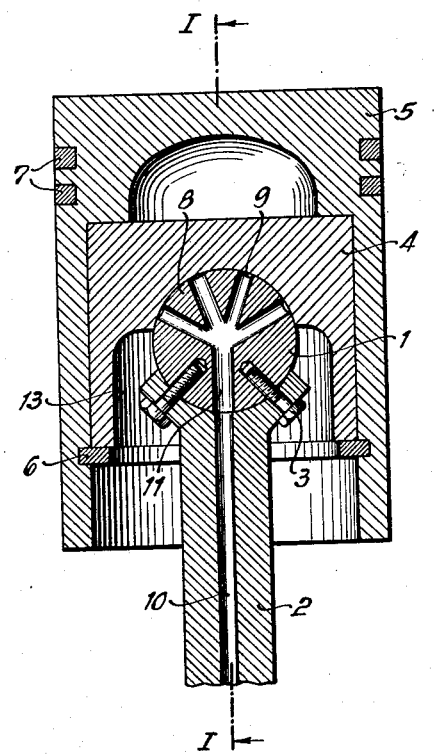
Fig. 2 is a longitudinal section taken along the line II—II of Fig. 1.

The problem underlying the present invention, namely to provide an improved wrist pin bearing employing a low priced bearing material, has been solved according to the present invention by designing the bearing surface of the wrist pin bed in which the wrist pin is journalled as an unbroken surface of a light metal member while the grooves for supplying lubricant and conveying the same to said bearing surface are provided in the wrist pin. As light metal, especially aluminum and aluminum alloys having good running properties have proved highly successful in this connection. Such aluminum alloys may for instance be Al—Si—Cn—Ni—Mg-alloys.

The arrangement according to the present invention brings about a favorable pressure development in the lubricating oil film on that bearing surface of the wrist pin bed which is subjected to a circumferential load and is free from interruptions such as grooves, recesses or the like. This arrangement in connection with a relatively non-expensive light metal construction of the bearing surface reduces the occurring frictional heat, while the heat still being developed is conducted away from the bearing portion in a favorable manner. The result is, therefore, a lower temperature of operation of the bearing surface.

According to a further development of the invention, the advantage obtained by the arrangement set forth in the preceding paragraph can still be increased when the wrist pin bearing is directly formed by a light metal wrist pin bed. In such an instance, the heat produced in the bearing is to a still greater extent conveyed into the mass of the wrist pin bed or into the mass of the piston from which it will be conducted away.

Referring now to the drawing in detail, the piston shown therein comprises the piston body 5 having arranged therein a wrist pin bed 4 which has been inserted into the piston body 5 from the bottom of the latter and is held in its position by means of a spring ring 6. The bearing surface of the wrist pin bed 4 for journalling engagement with the wrist pin 1 represents an unbroken surface of light metal. The lubricating oil is conveyed to said bearing surface through conduit means 10 extending through the connecting rod 2 and communicating with a lubricant conveying channel 11 in the wrist pin 1. The channel 11 communicates with radially extending channels 12 ending in grooves 9 on the outer bearing surface of the wrist pin 1. The grooves 9 extend substantially parallel to the longitudinal central axis of the wrist pin and are covered up by the sliding surface 8 of the wrist pin bed 4. The connecting rod 2 is fixedly connected to the wrist pin 1 by means of screws or bolts 3.

In order to allow the connecting rod 2 to pass into the wrist pin bed 4 and to move freely, the latter is provided with a corresponding bore 13. The lower portion of the wrist pin bed is furthermore provided with bores 14 tapering toward the bore 13 for returning lubricating oil. The piston is, of course, also provided in customary manner with piston rings 7.

It is, of course, understood that the present invention is, by no means, limited to the particular construction shown in the drawing but also comprises any modifications within the scope of the appended claims.

What I claim is:

1. In combination with a piston for internal combustion engines, a wrist pin, a single piece wrist pin bed arranged within said piston and made of light metal, said wrist pin bed comprising an unbroken bearing section engaging a first peripheral surface portion of said wrist pin along the entire length of said wrist pin for journalling the same, and a connecting rod having one end thereof detachably connected to a second peripheral surface portion of said wrist pin opposite said first peripheral surface portion, said connecting rod being provided with lubricant conveying conduit means extending therethrough, said first peripheral surface portion of said wrist pin being provided with lubricating grooves communicating through conduit means in said wrist pin with said lubricant conveying conduit means in said connecting rod.

2. A piston according to claim 1, in which aluminum is employed as light metal.

3. A piston according to claim 1, in which an aluminum alloy is employed as light metal.

References Cited in the file of this patent

UNITED STATES PATENTS

| | | |
|---|---|---|
| 1,320,428 | Stancliff | Nov. 4, 1919 |
| 2,069,594 | Schneider | Feb. 2, 1937 |
| 2,362,158 | Ricardo | Nov. 7, 1944 |
| 2,379,359 | Kettering | June 26, 1945 |
| 2,563,371 | Rippingille | Aug. 7, 1951 |
| 2,694,607 | Calling et al. | Nov. 16, 1954 |